No. 772,171. PATENTED OCT. 11, 1904.
A. NEILSON.
VESSEL.
APPLICATION FILED JUNE 1, 1904.
NO MODEL.

Witnesses:
K. H. Butler
E. E. Potter

Inventor
Andrew Neilson,
By N. C. Evert & Co.
Attorneys.

No. 772,171.

Patented October 11, 1904.

UNITED STATES PATENT OFFICE.

ANDREW NEILSON, OF WILSON, PENNSYLVANIA.

VESSEL.

SPECIFICATION forming part of Letters Patent No. 772,171, dated October 11, 1904.

Application filed June 1, 1904. Serial No. 210,631. (No model.)

*To all whom it may concern:*

Be it known that I, ANDREW NEILSON, a citizen of the United States of America, residing at Wilson, in the county of Allegheny and State of Pennsylvania, have invented certain new and useful Improvements in Vessels, of which the following is a specification, reference being had therein to the accompanying drawings.

This invention has relation to vessels, and more particularly to that class of receptacles which are provided with bails; and the object of this invention is to provide novel means in connection with the bail and the receptacle whereby a lid or cover which is adapted to be placed upon the vessel may be easily, quickly, and effectively removed when desired.

Another object of my invention is to provide means in connection with the bail whereby the lid or cover of a receptacle may be forced or pried from the vessel, and means is provided upon the bail whereby the bail may be locked in an inoperative position, whereby the vessel or receptacle may be carried in the usual and well-known manner.

In describing the invention in detail reference will be had to the drawings accompanying this application, wherein like numerals of reference indicate like parts throughout the several views, in which—

Figures 1, 2:
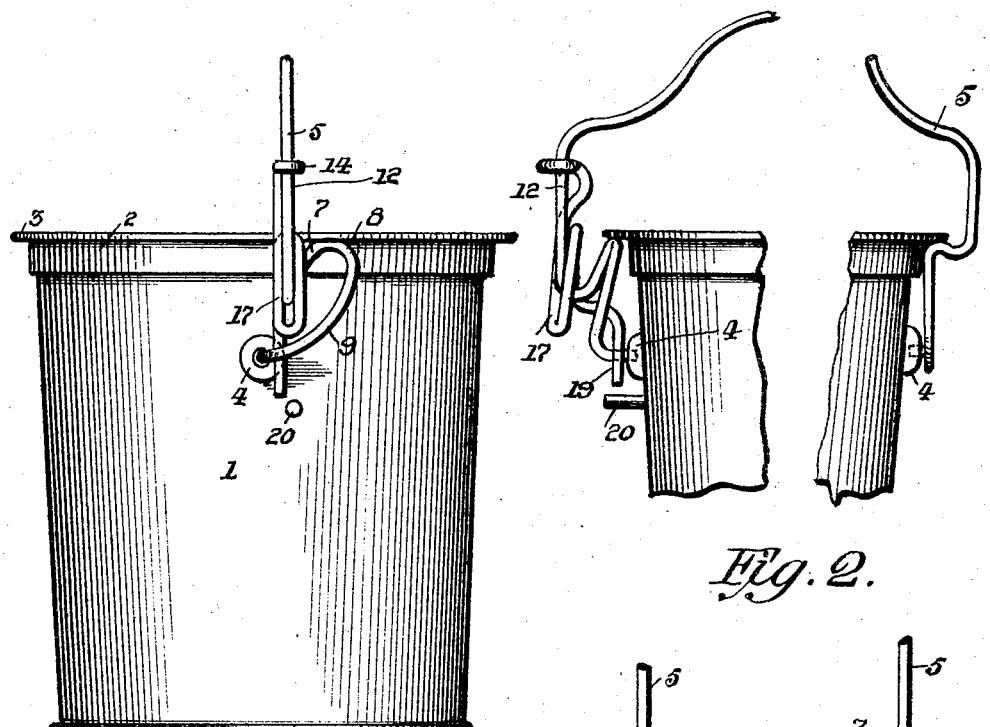
Figures 3, 4:
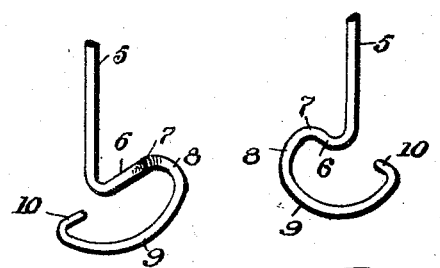
Figure 5:
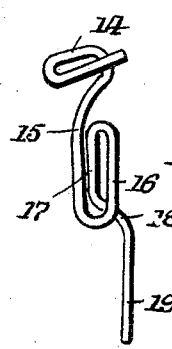
Figures 6, 7:
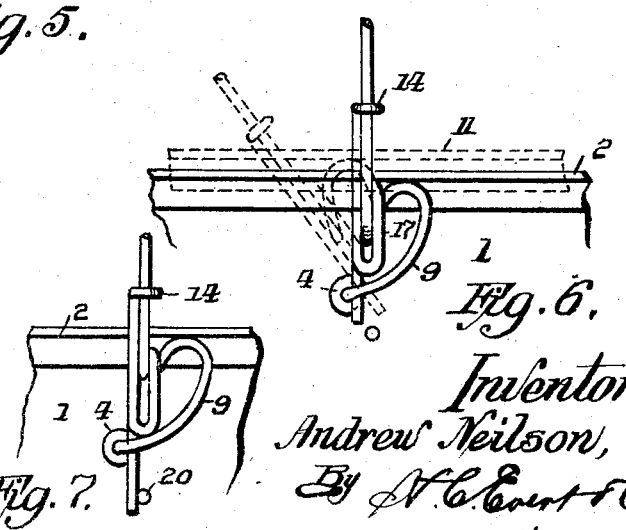

Figure 1 is a side elevation of a vessel, showing my improved bail mounted thereon. Fig. 2 is a front elevation of the bail as applied to a vessel, a portion of the same being broken away. Fig. 3 is a detail perspective view of one end of the bail. Fig. 4 is a detail perspective view of the other end of the bail. Fig. 5 is a detail perspective view of the locking-pin removed from the bail. Fig. 6 is a side elevation of one end of the bail, showing the same in an operative position in dotted lines; and Fig. 7 is a side elevation of the same end of the bail, showing the locking-pin in a locked position.

In the drawings accompanying this application the reference-numeral 1 indicates a receptacle or vessel upon which my improvement is applied, and in Fig. 1 of the drawings I have represented this receptacle or vessel of the form generally used as a lard-bucket, upon which a lid or cover 2 is adapted to be placed, and I have illustrated my improvements upon this type of receptacle or vessel owing to the fact that the lids or covers of lard-buckets generally fit upon the same in a snug and effective manner, whereby to remove the same it often occasions considerable exertion and trouble. Upon the periphery of the lid or cover 2 of the bucket I have provided an annular projecting flange 3, which may be formed integral with the body portion of the lid or cover, and upon the sides of the vessel and diametrically opposite each other I employ the sockets 4 4 to receive the ends of the bail 5, and it is the construction of this bail wherein my main improvement lies. The bail, as illustrated in Figs. 2, 3, and 4 of the drawings, has its ends bent to form a cam-surface which, as clearly illustrated in Fig. 2 of the drawings, is adapted to engage under the annular flange 3 of the lid. The bail is bent at right angles, as indicated by the reference-numeral 6, and then is bent upwardly, as indicated at 7, to form a cam-surface 8, and is then bent downwardly, as indicated at 9, and at right angles, as indicated at 10, to form a lug which is adapted to fit loosely within the sockets 4 4 upon the sides of the receptacle or vessel. By so constructing the bail I have provided the cam-surface 8, which when the bail is raised to a position to support the vessel or bucket the cam-surface 8 will engage under the flange 3, and upon the bail 5 being forced past its vertical position, as shown in Fig. 6 of the drawings, the lid or cover 2 will be raised from the bucket to the position shown in dotted lines, Fig. 6, and indicated by the reference-numeral 11, at which time the lid or cover may be easily removed from the receptacle.

In order that the bucket may be carried by the bail without causing the bail to remove the lid or cover, I have constructed a locking means which is mounted upon one end of the bail 5. The bail, as shown in Fig. 2 of the drawings, is formed with a vertical portion 12, and upon this portion of the bail and the right-angular portion 6 I mount the locking-pin, as illustrated in Fig. 5 of the drawings, this locking-pin consisting of a piece of wire, the one end of which is bent, as indicated at 14, to form a loop portion, and the wire is then bent downwardly, as indicated at 15, and bent upon itself, as indicated at 16, to form an oblong loop 17, the position of which is vertical in relation to the loop 14, and the end of the wire is then bent outwardly, as indicated at 18, and downwardly to form the engaging pin 19.

The reference-numeral 20 indicates a lug or pin which is formed upon the one side of the vessel adjacent to the boss 4, and it is upon this side of the vessel which carries the lug or pin 20 that I mount the locking-pin just described. In Figs. 1, 2, and 6 I have illustrated this locking-pin in an unlocked position, and in Fig. 7 of the drawings the pin is illustrated in a locked position. The loop 14 is adapted to surround the vertical portion 12 of the bail 5, and the bail is adapted to pass through the loop 17, and the engaging pin 19 is adapted to pass downwardly between the lugs 10 and the curved portion 9 of the bail. The locking-pin is held in a raised position by the frictional contact of the portion 16 engaging the right-angular portion 6 of the bail, and by pressing downwardly upon the loop 14 the engaging pin 19 will be carried downwardly until the top of the oblong loop 17 rests upon the right-angular portion 6, at which time the engaging pin 19 will be in engagement with the lug 10 of the bail and the pin or lug 20 of the receptacle, the locking-pin preventing the bail from being moved in the direction of the position shown in dotted lines in Fig. 6, whereby it will be impossible to remove the lid or cover of the bucket by the cam-surface of the bail, the locking-pin engaging the lug 10 and the pin 20 preventing the cam-surface 8 from engaging the flange 3 of the lid any further than that shown in Fig. 7 of the drawings.

It will be observed from the construction of the bail and the locking-pin carried by the same that the receptacle or bucket may be carried without any danger of the lid or cover being removed from the same by the bail of the bucket and that when it is desired the lid may be easily and quickly removed from the receptacle when it is necessary to remove the same. Heretofore in buckets of this type, wherein the lid or cover should fit snugly upon the same, it has often been impossible to remove the same without inserting a sharp instrument under the downwardly-extending flange of the lid to remove the same, this operation injuring and defacing the bucket, and by constructing my improved bail and locking-pin I have provided means whereby this troublesome feature of buckets of this type may be readily dispensed with, and while I have herein shown the bail and locking-pin as constructed upon a lard-bucket it is obvious that the same may be readily employed in connection with other receptacles, such as large tin cans, tubs, and the like, wherein a lid or cover is employed to protect the contents of the same.

What I claim is—

1. The combination with a receptacle having a flanged lid or cover and having sockets on the sides of the receptacle, of a wire bail having its ends trunnioned in the sockets on the sides of the receptacle, said bail being bent upon itself between the pivotal points and the upper part of the bail to form a cam eccentric to the pivotal points and adapted to be brought into contact with the flange of the lid to raise the lid.

2. In a device of the character described, the combination with a receptacle having a flanged lid or cover, of a pin carried by said receptacle, a bail pivotally mounted on said receptacle, said bail having a portion of its ends bent to engage the flange of the lid or cover, means carried by said bail to engage the pin of the receptacle and prevent the engagement of the bail with the lid or cover, substantially as described.

3. In a device of the character described, the combination with a receptacle having a flanged lid or cover, of a pin carried by said receptacle, a bail pivotally mounted upon said receptacle, a cam portion formed integral with said bail and adapted to engage the flange of the lid or cover, a locking-pin slidably mounted upon said bail and adapted to engage the pin of the receptacle, substantially as described.

4. In a device of the character described, the combination with a receptacle having a flanged lid, of a pin carried by said receptacle, a bail pivotally mounted upon said receptacle, the end portions of said bail being bent to form a cam-surface which is adapted to engage said lid or cover, a locking-pin slidably mounted upon said bail and adapted to engage the pin of the receptacle, substantially as described.

5. The combination with a receptacle having a flanged lid or cover, of a bail having its ends pivoted to opposite sides of the receptacle, said bail being composed of wire and being bent inwardly above the pivotal ends so as to extend beneath the flange of the lid or cover and the said inwardly-bent portion being bent upon itself to form a cam eccentric to the pivotal points.

6. In a device of the character described, the combination with the receptacle having a flanged lid or cover, of a bail having its ends pivoted in opposite sides of the receptacle, said bail being bent upon itself near one end to form a cam adapted to be moved by the swinging of the bail into engagement with the flange of the lid or cover to raise the latter from the receptacle, and a slidable member carried by the bail to coact with a member on the receptacle and limit the movement of the bail.

7. In a device of the character described, the combination with a receptacle having a flanged lid or cover, of a pin carried by said receptacle, a bail pivotally mounted upon said receptacle and adapted to engage the flanged lid or cover, of means carried by said bail to engage the pin carried by the receptacle and prevent the bail from engaging said lid or cover, substantially as described.

In testimony whereof I affix my signature in the presence of two witnesses.

ANDREW NEILSON.

Witnesses:
WM. J. NEILSON,
JAMES GRUBBS.